United States Patent [19]

Doles et al.

[11] 4,313,132
[45] Jan. 26, 1982

[54] CABLE TV SECURITY MEANS

[75] Inventors: Glenn P. Doles, Wonder Lake; James J. Beran, Cary, both of Ill.

[73] Assignee: Oak Industries Inc., Crystal Lake, Ill.

[21] Appl. No.: 89,873

[22] Filed: Oct. 31, 1979

[51] Int. Cl.³ .................. H04N 7/16; H04N 7/10; H04H 1/00
[52] U.S. Cl. ............................ 358/114; 358/86
[58] Field of Search .............. 358/114, 115, 117, 86

[56] References Cited

U.S. PATENT DOCUMENTS

| | | | |
|---|---|---|---|
| 3,050,712 | 8/1962 | Bruck | 358/86 |
| 3,244,809 | 4/1966 | Fuller et al. | 358/86 |
| 3,706,040 | 12/1972 | Gargini | 358/86 |
| 3,886,302 | 5/1975 | Kosco | 358/114 |
| 4,161,751 | 7/1979 | Ost | 358/114 |

*Primary Examiner*—S. C. Buczinski
*Attorney, Agent, or Firm*—Kinzer, Plyer, Dorn & McEachran

[57] ABSTRACT

Security means for cable television operators includes an enabling circuit which is located outside of the subscriber premises and is connected in circuit through the television cable with the power supply of the subscriber's cable television converter located within his premises. There is a sensing circuit between the enabling circuit and the power supply which determines the presence or absence of the enabling circuit and thus controls operation of the converter power supply.

8 Claims, 1 Drawing Figure

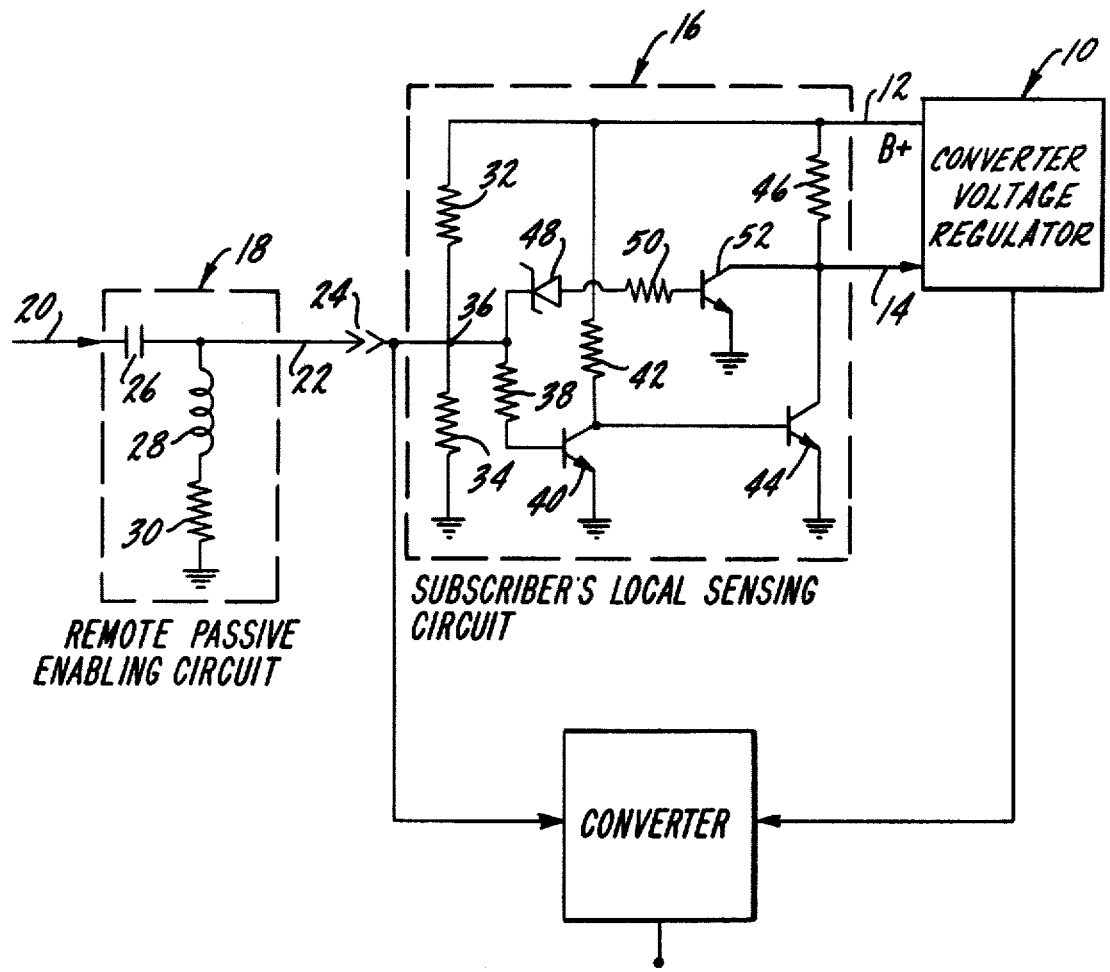

CABLE TV SECURITY MEANS

SUMMARY OF THE INVENTION

The present invention relates to security means for cable television and in particular to means located exteriorly of the subscriber's premises which can be used to control operation of the subscriber's cable television converter.

Another purpose is a simply constructed reliably operable sensing circuit for the use described which may be included in the cable television converter and cooperates with an exteriorly located enabling circuit to control operation of the converter power supply.

Another purpose is a sensing circuit of the type described which cooperates with an enabling circuit which may perform an enabling function for one or a multiple of cable television converters.

Other purposes will appear in the ensuing specification, drawing and claims.

BRIEF DESCRIPTION OF THE DRAWING

The invention is illustrated diagrammatically in the attached schematic diagram.

DESCRIPTION OF THE PREFERRED EMBODIMENT

In the cable television industry it is not uncommon for converters to be moved from one location to another and for individuals who are not paying a monthly rental to acquire converters which they may individually connect to a cable. It is also not uncommon for a subscriber who at one point pays regularly for a service to discontinue such payments, but without giving up the converter or the connection from the converter to the cable. The present invention provides a simplified means for the cable system operator to insure that only authorized converters can in fact receive signals from the cable. Essentially, an enabling circuit which is basically resistive in form is mounted exteriorly of the subscriber's premises, for example, on a utility pole or the like which is carrying the system's cable. The enabling circuit is effectively in circuit with an individual converter located in the subscriber's premises through a sensing circuit which is a part of the converter. The presence or absence of the enabling circuit controls operation of the converter power supply and thus operation of the converter itself.

The converter power supply and voltage regulator are indicated generally at 10 and there is a line 12 which carries the unregulated DC voltage and a second line 14 which will be connected normally to the base of the pass transistor which conventionally forms the on-off portion of the voltage regulator. A sensing circuit is indicated generally at 16 and is connected to the power supply voltage regulator lines 12 and 14. An enabling circuit is indicated at 18 and has its input side connected to the cable tap 20. The output from enabling circuit 18 will be connected to a drop cable 22 which will extend from the enabling circuit to the input of the cable television converter as diagrammatically illustrated by a jack 24.

The enabling circuit includes a capacitor 26, a choke coil 28 and a resistor 30. The value of resistor 30 will remain constant regardless of the number of subscribers as the enabling circuit is effective for operation of multiple converters, for example in a multiple family dwelling or a single converter.

Voltage line 12 is connected to a voltage divider made up of resistors 32 and 34 with the terminal point therebetween, indicated at 36, being connected to jack 24 and thus to enabling circuit 18. The voltage at terminal point 36, as controlled by the presence or absence of resistor 30, is effective to control the operation of the sensing circuits as described.

The low level sensing circuit includes a resistor 38 connected to the base of a transistor 40 whose emitter is connected to ground. The collector of transistor 40 is connected through a resistor 42 to voltage line 12. The collector of transistor 40 is also connected to the base of a second transistor 44 whose emitter is connected to ground and whose collector is connected to line 14 and through a resistor 46 to line 12.

The high level sensing circuit includes a Zener diode 48 connected through a resistor 50 to the base of a transistor 52. Transistor 52 has its emitter grounded and its collector connected to line 14 and to line 12 through resistor 46.

The resistance in the enabling circuit cooperates with the voltage on line 12 to provide a voltage at terminal 36 which will maintain transistor 40 in a conducting condition which in turn maintains transistor 44 in a non-conducting condition. Thus, there will be no disabling short circuit present on line 14. Similarly, Zener diode 48 will not conduct, thus maintaining transistor 52 in a non-conducting condition which again will not provide a disabling short circuit on line 14.

In the event that the voltage at terminal 36 is below the permitted range of values, for example caused by an effective short circuit due to the absence of enabling circuit 18, then transistor 40 will be placed in a non-conductive condition causing transistor 44 to conduct which in turn will place a disabling short circuit on line 14. Such a short circuit prevents operation of the pass transistor of the power supply voltage regulator. Thus, the power supply is disabled. In like manner, if the voltage at terminal 36 is above that permitted by the high level sensing circuit, for example caused by an effective open circuit due to the absence of the enabling circuit, the voltage at terminal 36 will be above the threshold for conduction of Zener diode 48 which will permit the diode to conduct, which in turn will turn on transistor 52. When transistor 52 conducts, there is a disabling short circuit present on line 14.

Both a high level and low level sensing circuit are desired, as it permits a window of voltages at terminal 36 so as to accomodate an enabling circuit for both single converter use and multiple converter use. The complete absence of an enabling circuit will, as described, cause the voltage regulator to be disabled.

To provide security the enabling circuit must be located outside of the subscriber's premises and normally at a location not accessible to the subscriber. It should be totally within the control of the cable operator so that he can prevent the operation of unauthorized converters.

Whereas the preferred form of the invention has been shown and described herein, it should be realized that there may be many modifications, substitutions and alterations thereto.

We claim:

1. In combination with a cable TV converter having a power supply, a passive enabling circuit adapted to be connected to the TV cable at a location remote from the converter and remote from the subscriber's premises, a sensing circuit connected to the TV cable at the converter cable input and to the converter power supply to provide power to said enabling circuit through the TV cable from the power supply, means in said sensing circuit controlling operation of said power supply in accordance with the presence or absence of the enabling circuit, and said enabling circuit, when connected to said sensing circuit and power supply, providing an input voltage at said sensing circuit to maintain operation of said power supply.

2. The combination of claim 1 further characterized in that said sensing circuit includes a high level voltage sensing means and a low level voltage sensing means, with either of said sensing means being connected to disable said power supply.

3. In combination with a cable TV converter having a regulated power supply, a passive resistive enabling circuit adapted to be connected to the TV cable at a location remote from the converter and remote from the subscriber's premises, a sensing circuit connected to the TV cable at the converter cable input and having two connections to the converter regulated power supply, one of said connections being to the unregulated DC power of the power supply, said sensing circuit thereby connecting said enabling circuit through the TV cable with the power supply, means in said sensing circuit controlling on-off operation of said power supply in accordance with the presence or absence of the enabling circuit, and said enabling circuit, when connected to said sensing circuit and power supply, providing an input voltage at said sensing circuit to maintain operation of said power supply.

4. The combination of claim 3 further characterized in that said resistive enabling circuit is directly connected to the unregulated DC power in said power supply through said sensing circuit with the presence or absence of said resistive enabling circuit determining the voltage at the input of said sensing circuit.

5. The combination of claim 4 further characterized in that said sensing circuit includes a high level voltage sensing means and a low level voltage sensing means, said sensing circuit providing a disabling input to the power supply if the voltage at the sensing circuit input, caused by the presence or absence of said resistive enabling circuit, is either above or below limits prescribed by said high level voltage sensing means and low level voltage sensing means.

6. The combination of claim 5 further characterized in that said high level voltage sensing means includes a Zener diode and a transistor connected in series between said resistive enabling circuit and said power supply.

7. The combination of claim 5 further characterized in that said low level sensing means includes a transistor connected between said resistive enabling circuit and said power supply.

8. The combination of claim 7 further characterized in that said low level sensing means includes a second transistor, series connected with said first transistor, between said resistive enabling circuit and said power supply.

* * * * *